United States Patent
Bastide et al.

(10) Patent No.: US 8,640,026 B2
(45) Date of Patent: Jan. 28, 2014

(54) WORD CORRECTION IN A MULTI-TOUCH ENVIRONMENT

(75) Inventors: Paul R Bastide, Boxford, MA (US); Matthew E Broomhall, South Burlington, VT (US); Robert E Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 13/180,259

(22) Filed: Jul. 11, 2011

(65) Prior Publication Data

US 2013/0019169 A1    Jan. 17, 2013

(51) Int. Cl.
     *G06F 17/00*      (2006.01)

(52) U.S. Cl.
     USPC .......................................... 715/257; 715/259

(58) Field of Classification Search
     USPC ......................................... 715/259, 200, 257
     See application file for complete search history.

(56) References Cited

U.S. PATENT DOCUMENTS

| | | | | |
|---|---|---|---|---|
| 5,367,453 | A | * | 11/1994 | Capps et al. .................. 715/235 |
| 5,806,021 | A | * | 9/1998 | Chen et al. ......................... 704/9 |
| 6,292,176 | B1 | * | 9/2001 | Reber et al. .................... 345/169 |
| 7,076,731 | B2 | * | 7/2006 | Brill et al. ...................... 715/257 |
| 7,398,210 | B2 | | 7/2008 | Valdes et al. |
| 8,036,878 | B2 | * | 10/2011 | Assadollahi .................... 704/10 |
| 8,117,540 | B2 | * | 2/2012 | Assadollahi .................. 715/256 |
| 2003/0187649 | A1 | | 10/2003 | Logan et al. |
| 2005/0091030 | A1 | | 4/2005 | Jessee et al. |
| 2009/0077464 | A1 | | 3/2009 | Goldsmith et al. |
| 2009/0092323 | A1 | | 4/2009 | Qiu et al. |
| 2009/0254501 | A1 | | 10/2009 | Song et al. |
| 2010/0161655 | A1 | * | 6/2010 | Gil et al. ....................... 707/769 |
| 2010/0218141 | A1 | | 8/2010 | Xu et al. |
| 2010/0287486 | A1 | | 11/2010 | Coddington |
| 2011/0035209 | A1 | * | 2/2011 | Macfarlane ....................... 704/9 |

OTHER PUBLICATIONS

Sony "Swype—Improve Speed of Your Text Input on Touch-Screen Mobiles" mynokiamobile.com, (Sep. 2010), available at http://mynokiamobile.org/2010/09/02/swype-improve-speed-of-your-text-input-on-touch-screen-mobiles/, 5 pages, last accessed Jul. 11, 2011.

"IBM Content Analytics: Executive Overview" IBM, available at: http://www-01.ibm.com/software/globalization/topics/languageware/, 1 page, last accessed Jul. 11, 2011.

"alphaWorks: Text Analytics Tools and Runtime for IBM LanguageWare: Overview" IBM, (Dec. 2006), available at: http://www.alphaworksibm.com/tech/lrw, 3 pages, last accessed Jul. 11, 2011.

\* cited by examiner

*Primary Examiner* — Manglesh M Patel
(74) *Attorney, Agent, or Firm* — Jeffrey T. Holman (57) ABSTRACT

A method for word correction on a multi-touch device, including: detecting a selection by a user of a word displayed in a user interface of the multi-touch device; breaking the word into logical segments; presenting the logical segments in the user interface; detecting a user-selected segment of one of the logical segments; displaying at least one alternative segment for the user-selected segment in the user interface; and altering the selected segment in response to receiving a user-selected replacement from the at least one alternative segment.

20 Claims, 4 Drawing Sheets

WORD CORRECTION IN A MULTI-TOUCH ENVIRONMENT

BACKGROUND

Touch and multi-touch devices that allow users to interact with a user interface by touching the display on the device or by interacting with the device in a touch environment, including many smart phones, tablets with touch screens, multi-touch mice, trackpads, and other devices, are widely used for various applications. Users are able to perform actions on touch devices by tapping or other actions with a finger or stylus, which can make performing some operations more intuitive than using a mouse or a keyboard.

Because touch devices often do not include a separate keyboard, typing on touch devices may be more difficult for users than on devices with separate keyboards because of the smaller space available on the touch display. Typing on a touch display may also be difficult for users who are used to typing with a physical keyboard. Additionally, many touch devices may include small displays. A small display on a touch device may make navigating to specific places in the text cumbersome or even inaccurate. Consequently, making quick corrections to text that has already been typed into the device can also be difficult.

SUMMARY

Embodiments of a method are described. In one embodiment, the system is a method for word correction in a multi-touch device. The method includes: detecting a selection by a user of a word displayed in a user interface of the multi-touch device; breaking the word into logical segments; presenting the logical segments in the user interface; detecting a user-selected segment of one of the logical segments; displaying at least one alternative segment for the user-selected segment in the user interface; and altering the selected segment in response to receiving a user-selected replacement from the at least one alternative segment. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for word correction in a multi-touch environment, such as a multi-touch mobile phone or other mobile device. More specifically, the system detects a user focus on a given word, breaks the word into segments, and presents related word segments to allow the user to change the given word according to a selection from the related word segments. In some embodiments, the system allows the user to enter a manual correction for the given word if the user does not find a correct replacement in the related word segments.

In conventional touch devices, correcting text already typed into the device can be cumbersome, particularly if the device a relatively small display with which the user is able to interact. For example, positioning a cursor at a specific location on the display or selecting a given letter or group of letters may be more difficult and may be somewhat inaccurate, especially if the user interacts with the device with a finger. The system and method described herein allow the user to focus on individual segments of a selected word 116 and the system presents the user with alternatives for a highlighted segment. By correcting the selected word 116 in segments that include groups of letters by presenting the user with alternatives to the segments, the system and method eliminate or reduce the need to position the cursor at a specific location or to select an individual letter, which may provide easier correction of a misspelled or misused word.

Figure 1:
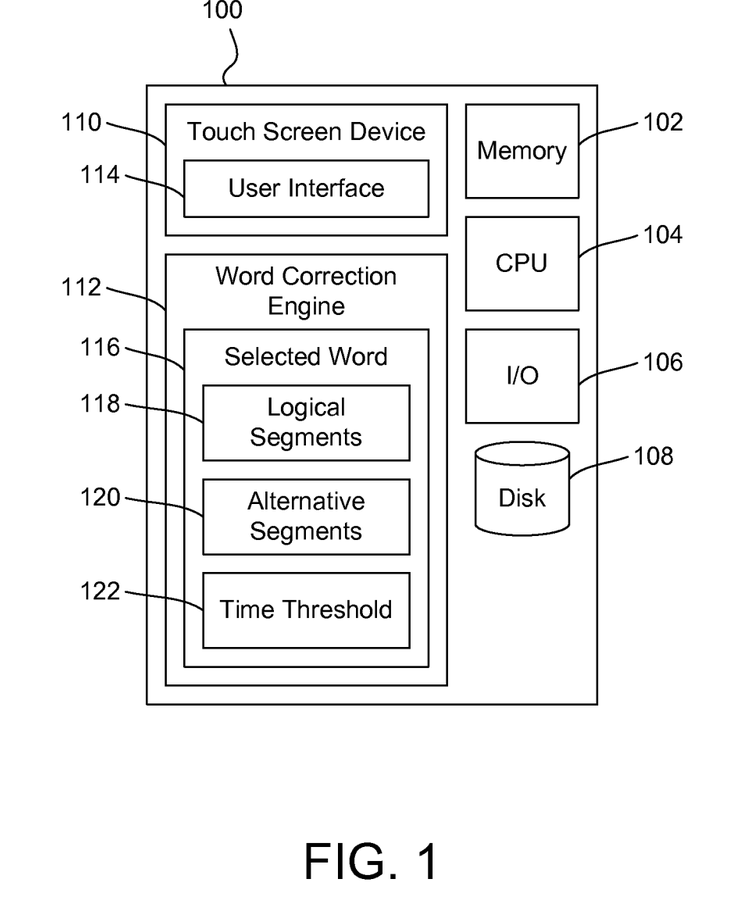
FIG. 1 depicts a schematic diagram of one embodiment of a word correction system.
Figure 4:
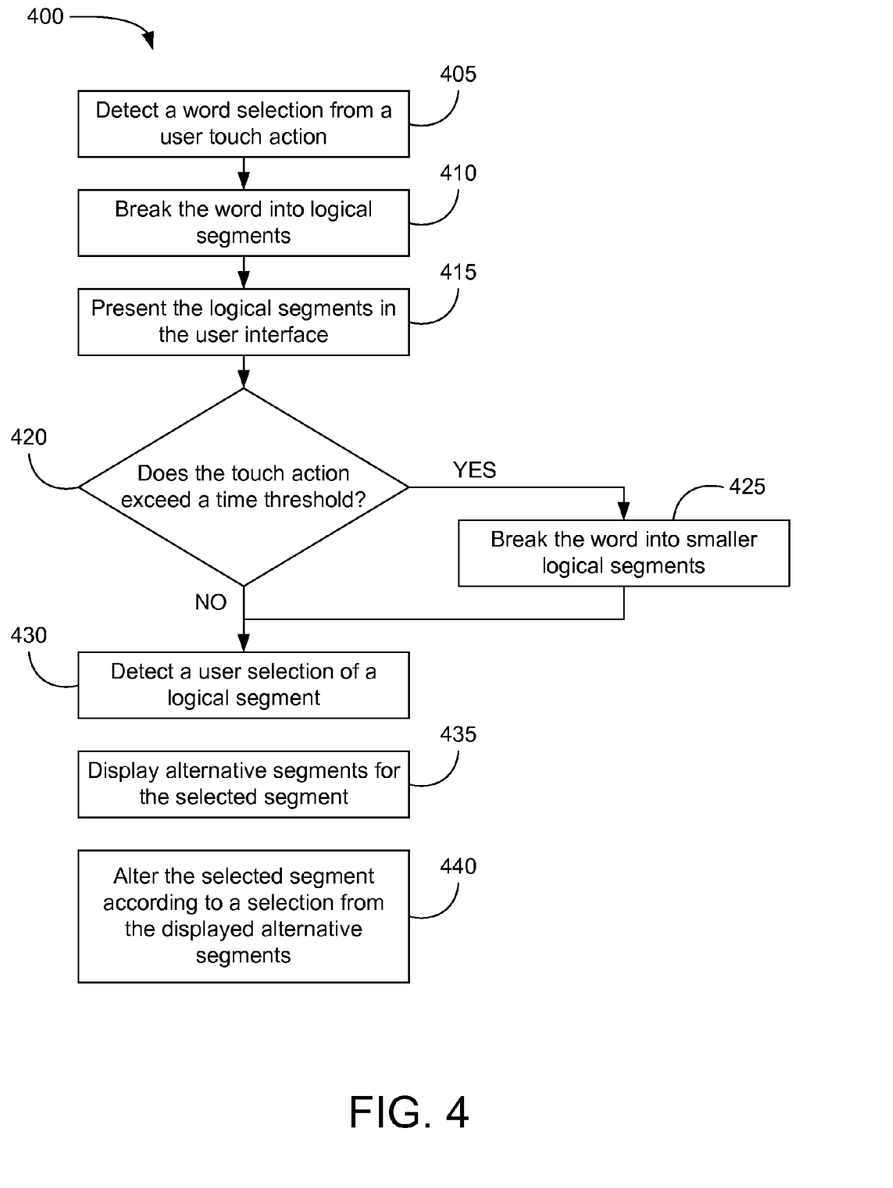
FIG. 4 depicts a flow chart diagram of one embodiment of a method for word correction on a multi-touch device.

FIG. 1 depicts a schematic diagram of one embodiment of a word correction system. The depicted word correction system 100 includes various components, described in more detail below, that are capable of performing the functions and operations described herein. In one embodiment, at least some of the components of the word correction system 100 are implemented in a computer system. For example, the functionality of one or more components of the word correction system 100 may be implemented by computer program instructions stored on a computer memory device 102 and executed by a processing device 104 such as a CPU. The word correction system 100 may include other components, such as a disk storage drive 108, input/output devices 106, a multi-touch device 110, and a word correction engine 112. Some or all of the components of the word correction system 100 may be stored on a single computing device or on a network of computing devices, including a wireless communication network. The word correction system 100 may include more or fewer components or subsystems than those depicted herein. In some embodiments, the word correction system 100 may be used to implement the methods described herein as depicted in FIG. 4.

In one embodiment, the word correction system 100 includes a multi-touch device 110. The multi-touch device 110 includes a user interface 114 that provides a touch or multi-touch environment for the user to perform operations on the multi-touch device 110. In some embodiments, a touch environment may allow a user to interact with the user interface 114 by directly touching elements displayed on the multi-touch device 110. In some embodiments, the multi-touch environment may allow a user to interact with the user interface 114 at more than one point of contact. In other embodiments, the multi-touch device 110 may include an input device 106, such as a multi-touch mouse, trackpad, and similar devices, that responds to touch actions performed by the user. In various embodiments, the multi-touch device 110 may be a desktop computer, a laptop computer, a mobile phone, a tablet computing device, a desktop with a touch screen monitor, or any other device that includes a user interface 114 having a touch or multi-touch environment.

In one embodiment, the word correction system 100 includes a word correction engine 112. In one embodiment, the operations performed by the word correction engine 112 are performed entirely by the multi-touch device 110. In other embodiments, at least some of the operations performed by the word correction engine 112 are performed by other devices, such as a server or other device on a wireless communication network.

The word correction engine 112 detects user interaction with the user interface 114 to determine that the user has selected a word 116 that has been typed into the user interface 114. In some embodiments, the selected word 116 may be a misspelled word that was detected by a spellchecking system on the multi-touch device 110 or that was detected by the user. In other embodiments, the selected word 116 may be a misused word detected by a grammar-checking system or by the user.

In some embodiments, the user selects the word 116 by tapping the word 116 displayed on the multi-touch device 110. In other embodiments, other touch actions may be used to indicate the selected word 116, depending on the device and/or application. When the user performs the touch action on the selected word 116, the word correction engine 112 responds by breaking the selected word 116 into logical segments 118 when possible. The logical segments 118 may be displayed on the multi-touch device 110 in any manner. For example, the multi-touch device 110 may display the selected word 116 exploded into the logical segments 118 such that the user is able to visually distinguish the logical segments 118 from one another. In various embodiments, the logical segments 118 may be exploded vertically or horizontally or in any other arrangement. In some embodiments, the logical segments 118 are syllables for the selected word 116. In other embodiments, the word correction system 100 breaks the selected word 116 into compound word segments. In one embodiment, the word correction system 100 performs additional or different operations in response to a user action that is maintained to exceed a predetermined time threshold 122, such as the user pressing the selected word 116 for a specific amount of time.

The user may select one of the logical segments 118 to be altered. In one embodiment, the user selects the logical segment 118 by tapping the logical segment 118 in the user interface 114, though the user may select the logical segment 118 using any touch action. In some embodiments, the logical segments 118 may be displayed larger than the original text of the selected word 116 so that the user is able to see and select the logical segments 118 more easily.

The word correction system 100 may then display one or more alternative segments 120 for the selected logical segment 118 on the multi-touch device 110. The alternative segments 120 may be displayed proximate the selected logical segment 118 on the multi-touch device 110, in some embodiments. In other embodiments, the alternative segments 120 may be displayed in a static location in the user interface 114, regardless of the location of the selected word 116 or selected logical segment 118 in the user interface 114.

When the user selects one of the alternative segments 120 displayed on the user interface 114, the word correction engine 112 may alter the selected logical segment 118 by replacing the selected logical segment 118 with the alternative segment 120. In some embodiments, the user may not find the desired replacement among the alternative segments 120, in which case the word correction system 100 may allow the user to manually correct the selected logical segment 118 for the selected word 116. Any manually entered/altered words may be stored in the memory device for later use by the word correction system 100.

In some embodiments, the word correction system 100 may detect patterns of usage by the user and may present alternative segments 120 according to the detected patterns of usage. For example, if the user commonly misspells a given word in the same manner, and then the user corrects the misspelled word, the word correction system 100 may detect the pattern of correction and thereafter organize the alternative segments 120 to display the common usage in a prominent location in the alternative segments 120.

Figure 2:
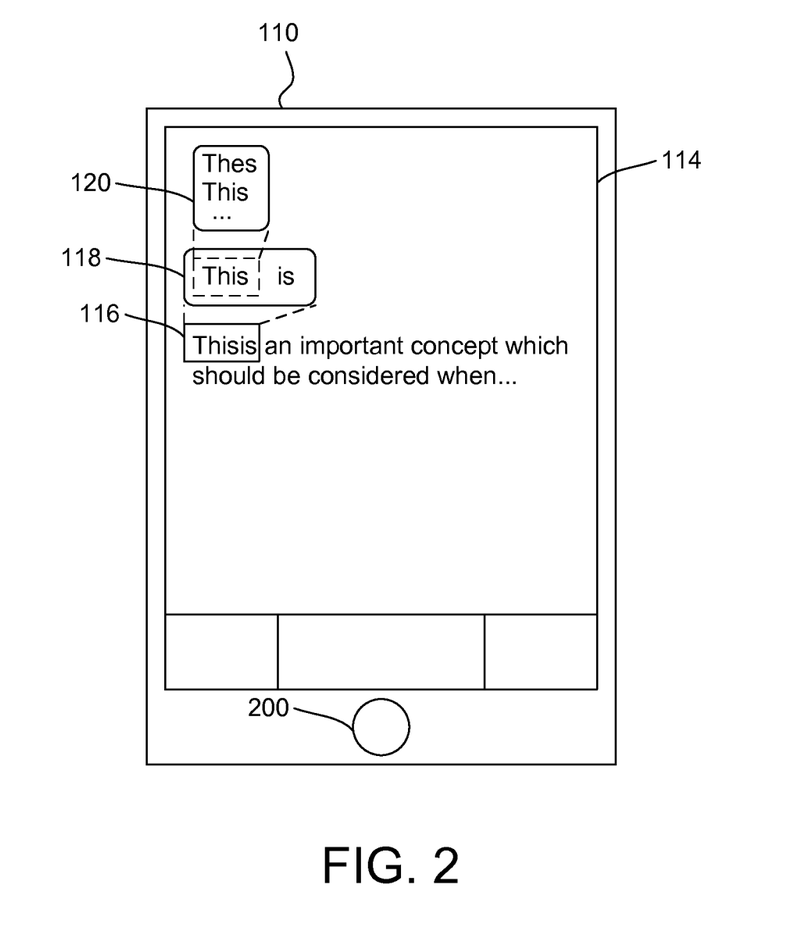
FIG. 2 depicts a schematic diagram of one embodiment of the multi-touch device of FIG. 1.

FIG. 2 depicts a schematic diagram of one embodiment of the multi-touch device 110 of FIG. 1. While the word correction system 100 is described herein in conjunction with the multi-touch device 110 of FIG. 2, the word correction system 100 may be used in conjunction with any multi-touch device 110 or combination of multi-touch devices 110.

In one embodiment, the multi-touch device 110 is a mobile phone, such as a smart phone. The multi-touch device 110 may allow a user to perform touch actions in a user interface 114, such as an operating system, and may also allow the user to perform operations by interacting with buttons 200 or other components. The touch actions may include tapping on a display area of the multi-touch device 110, dragging, holding, or any other action that may be performed on a multi-touch device 110. The touch actions may be performed using a finger, a stylus, or another object.

In one embodiment, the user selects a word 116 that is either misspelled or misused for the desired context. In some embodiments, the selected word 116 may include more than one word with no spaces. The user selects the word 116 by performing the touch action. When the word correction system 100 detects that a word 116 has been selected, the word selection breaks the selected word 116 into logical segments 118. The word correction system 100 may visually group the logical segments 118 with respect to the rest of the text shown in the user interface 114 while maintaining some visual separation between each of the logical segments 118. This may allow the user to distinguish each of the logical segments 118 more easily.

In some embodiments, the logical segments 118 may be displayed to overlay the selected word 116. In other embodiments, the logical segments 118 may be displayed above, below, or to the side of the selected word 116 so that the user may still see the selected word 116. In some embodiments, the logical segments 118 may be displayed in a specific portion of the user interface 114, such as a bottom of the user interface 114, rather than a position determined by the location of the selected word 116.

When the user performs a touch action on one of the logical segments 118, the word correction system 100 may then display alternative segments 120 for the selected logical segment 118. The alternative segments 120 may be selected based on common alternative usages of letters similar to those in the selected logical segment 118. In one embodiment in which the selected logical segment 118 is a four-letter segment, the alternative segments 120 each share at least three letters with the four-letter segment, such that only one letter differs between each alternative segment 120 and the selected logical segment 118. The alternative segments 120 displayed by the word correction system 100 may be common groupings of letters similar to the selected logical segment 118. The alternative segments 120 may be displayed in a list format, in a horizontal format, or any other format. The alternative segments 120 may be displayed to overlay either the selected logical segment 118 or the selected word 116, in some embodiments. In other embodiments, the alternative segments 120 may be displayed without obstructing either the selected word 116 or the logical segments 118.

Figure 3:
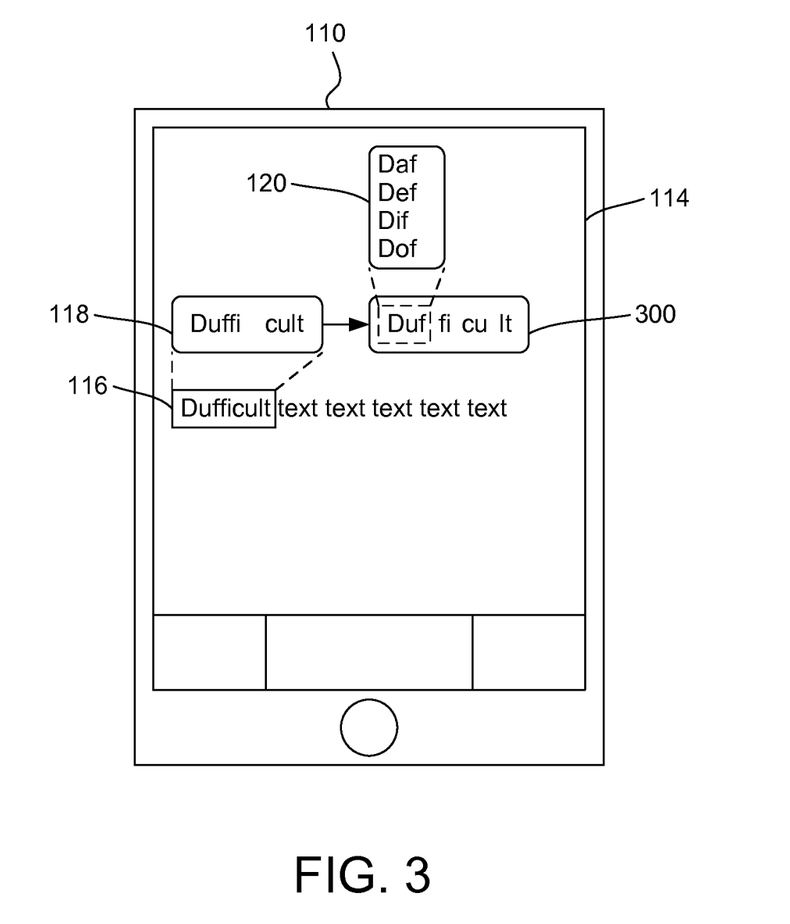
FIG. 3 depicts a schematic diagram of one embodiment of the multi-touch device of FIG. 1.

FIG. 3 depicts a schematic diagram of one embodiment of the multi-touch device 110 of FIG. 1. In one embodiment of the multi-touch device 110, the word correction system 100 responds differently to different touch actions performed by the user.

In one embodiment, the word correction system 100 detects a length of time for the touch action and performs a different or additional operation if the length of time exceeds a predetermined time threshold 122 than if the length of time does not exceed the time threshold 122. For example, if the user simply taps the selected word 116, the word correction system 100 may perform an action such as breaking the selected word 116 into a first set of logical segments 118. If the user touches the selected word 116 and holds the contact on the selected word 116 for a time greater than the time threshold 122, the word selection engine may first break the selected word 116 into logical segments 118 in response to the initial touch action, and then further break the selected word 116 into smaller logical segments 300 in response to the maintained contact on the selected word 116. In other embodiments, the word correction system 100 may only perform one action in response to the touch action that exceeds the time threshold 122.

In some embodiments, the selected word 116 may be highlighted on the user interface 114. The logical segments 118 may be highlighted in some way to distinguish the logical segments 118 from other text or elements displayed in the user interface 114. In one embodiment, the logical segments 118 are displayed in a box or other shape with a border such that the logical segments 118 are displayed on top of other elements in the user interface 114. In one embodiment, the logical segments 118 are displayed in a first position on the user interface 114, and if the word correction system 100 breaks the selected word 116 into smaller logical segments 300 in response to a specific touch action, the smaller logical segments 300 are displayed in a second position on the user interface 114. In another embodiment, the smaller logical segments 300 replace the initial logical segments 118.

The alternative segments 120 may be displayed in different positions of the user interface 114 for the smaller logical segments 300 than the initial logical segments 118, depending on the display configuration. In either case, the user may select an alternative segment 120 to replace the logical segment 118 selected by the user. In one embodiment, when the alternative segment 120 is selected, the logical segments 118 are removed from the user interface 114, and the selected word 116 is altered according to the selected replacement from the alternative segments 120. In another embodiment, the selected alternative segment 120 replaces the selected logical segment 118 and the logical segments 118 remain on the user interface 114 until the user performs a specific action on the multi-touch device 110, such that the user may replace additional segments.

FIG. 4 depicts a flow chart diagram of one embodiment of a method 400 for word correction on a multi-touch device 110. Although the method 400 is described in conjunction with the word correction system 100 of FIG. 1 and the multi-touch device 110 of FIGS. 2 and 3, embodiments of the method 400 may be implemented with other types of word correction systems 100 and/or multi-touch devices 110.

In one embodiment, the word correction system 100 detects 405 a selected word 116 in the user interface 114 of the multi-touch device 110 via a user touch action. The selected word 116 may be indicated as an incorrect spelling or usage by the word correction system 100 or by the user. In other embodiments of the word correction system 100, the user may select a word by operating a button or other device, rather than performing a touch action.

When the word correction system 100 detects the selected word 116, the word correction system 100 breaks 410 the selected word 116 into logical segments 118. The logical segments 118 may be determined based on word syllables, compound word segments, fixed numbers of letters for each segment, or any other manner of separating the selected word 116 into segments. In some embodiments, the selected word 116 may not be large enough to break into segments, in which case the word correction system 100 may treat the selected word 116 as one segment.

The word correction system 100 presents 415 the logical segments 118 in the user interface 114 to be viewed by the user. The logical segments 118 may be displayed in any part of the user interface 114. In some embodiments, the logical segments 118 may be highlighted to differentiate the logical segments 118 from other text and elements in the user interface 114. In some embodiments, the logical segments 118 are presented in an exploded view, such that a space is shown between each of the logical segments 118.

In one embodiment, the word correction system 100 is configured to determine 420 whether the user touch action is maintained to exceed a predetermined time threshold 122. The time threshold 122 may be a threshold sufficiently long to determine that the user intends to perform a touch action more than simply tapping the multi-touch device 110, for example. In response to determining that the touch action is maintained to exceed the time threshold 122, the word correction system 100 may perform additional or different operations than the operation performed by tapping. In one embodiment, the word correction system 100 breaks 425 the selected word 116 into smaller logical segments 300 in response to the user maintaining touch contact. The smaller logical segments 300 may be derived from the initial logical segments 118 or from the selected word 116. In other embodiments, the word correction system 100 may perform the operations described herein in response to other user actions.

In one embodiment, the word correction system 100 detects 430 a user selection of a logical segment 118 displayed in the user interface 114. The selected logical segment 118 may be the segment of the selected word 116 to be modified. When the word correction system 100 detects the selected logical segment 118, the system 100 determines corresponding alternative segments 120 and then displays 435 the alternative segments 120 on the multi-touch device 110. In some embodiments, the alternative segments 120 may include common alternatives to the selected logical segment 118 in which each of the common alternatives shares similar letters to the selected logical segment 118, but has at least one letter difference than the selected logical segment 118. In other embodiments, the alternative segments 120 may be determined based on other criteria. In some embodiments, if the selected word 116 cannot be broken down into logical segments 118, the word correction system 100 presents a list of alternative words in the user interface 114. In one embodiment, for selected logical segments 118 including only two letters, the word correction system 100 may intelligently display two-letter alternative segments 120. The displayed two-letter alternative segments 120 may be common alternatives, including letters that may make similar sounds or that are frequently used in place of the letters in the selected logical segment 118. In other embodiments, the alternative segments 120 may include the same letters from the selected logical segment 118, but in a different order.

After the user selects an alternative segment 120 that matches the correct spelling/usage intended by the user, the word correction system 100 alters 440 the selected logical segment 118 using the user-selected replacement from the alternative segments 120. In some embodiments, none of the alternative segments 120 match the correct spelling/usage intended by the user for the selected word 116. The word correction system 100 may allow the user to enter a manual replacement for altering the selected logical segment 118 in such cases. The user may enter a manual correction mode by tapping (or performing another touch action) the selected word 116 or selected logical segment 118 again while the alternative segments 120 are presently displayed. The manual replacement may be entered using a virtual or physical keyboard for the multi-touch device 110.

In one embodiment, the word correction system 100 allows the user to make changes to more than one segment before making any alterations to the selected word 116. The user may select the replacement for each of the selected logical segments 118 based on separate lists of alternative segments 120. When the selected logical segments 118 correctly match the intended spelling/use of the selected word 116, the user may perform an action to indicate to the word correction system 100 that the selected word 116 is to be altered based on the user-selected replacements. In one embodiment, the user touches to the end of the selected word 116 to set the changes to the selected word 116.

An embodiment of a word correction system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, including an operation for word correction in a multi-touch environment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium or device is a specific type of computer-readable or—usable medium. Examples of a computer-readable storage medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
   a non-transitory computer readable storage medium to store a computer readable program, wherein the computer readable program, when executed by a processor within a computer, causes the computer to perform operations for word correction in a multi-touch device, the operations comprising:
   detecting a selection by a user of a word displayed in a user interface of the multi-touch device;
   breaking the word into logical segments, wherein at least one of the logical segments comprises a plurality of characters;
   presenting the logical segments in the user interface;
   detecting a user-selected segment of one of the logical segments;
   displaying at least one alternative segment for the user-selected segment in the user interface; and
   altering the selected segment in response to receiving a user-selected replacement from the at least one alternative segment.

2. The computer program product of claim 1, wherein the alternative segment comprises a common alternative usage of letters similar to the user-selected segment.

3. The computer program product of claim 1, wherein the computer readable program, when executed on the computer, causes the computer to perform additional operations, comprising:
   determining a plurality of alternative segments for the user-selected segment, wherein each alternative segment comprises at least one letter difference than the user-selected segment; and
   displaying the plurality of alternative segments in the user interface.

4. The computer program product of claim 3, wherein the computer readable program, when executed on the computer, causes the computer to perform additional operations, comprising:
   altering the selected segment in response to receiving a manual user replacement, wherein the at least one alternative segment is determined to be an incorrect replacement for the user-selected segment.

5. The computer program product of claim 1, wherein breaking the word into logical segments further comprises separating the word into syllables.

6. The computer program product of claim 1, wherein breaking the word into logical segments further comprises separating the word into compound word segments.

7. The computer program product of claim 1, wherein the computer readable program, when executed on the computer, causes the computer to perform additional operations, comprising:
   breaking at least one logical segment comprising a plurality of characters into smaller logical segments in response to a user input to the multi-touch device, wherein the user input comprises maintained contact on the word on the multi-touch device for an amount of time that exceeds a predetermined time threshold.

8. A method for word correction on a multi-touch device, comprising:
   detecting a selection by a user of a word displayed in a user interface of the multi-touch device;
   breaking the word into logical segments, wherein at least one of the logical segments comprises a plurality of characters;
   presenting the logical segments in the user interface;
   detecting a user-selected segment of one of the logical segments;
   displaying at least one alternative segment for the user-selected segment in the user interface; and
   altering the selected segment in response to receiving a user-selected replacement from the at least one alternative segment.

9. The method of claim 8, wherein the alternative segment comprises a common alternative usage of letters similar to the user-selected segment.

10. The method of claim 8, further comprising:
    determining a plurality of alternative segments for the user-selected segment, wherein each alternative segment comprises at least one letter difference than the user-selected segment; and
    displaying the plurality of alternative segments in the user interface.

11. The method of claim 10, further comprising:
    altering the selected segment in response to receiving a manual user replacement, wherein the at least one alternative segment is determined to be an incorrect replacement for the user-selected segment.

12. The method of claim 8, wherein breaking the word into logical segments further comprises separating the word into syllables.

13. The method of claim 8, wherein breaking the word into logical segments further comprises separating the word into compound word segments.

14. The method of claim 8, further comprising:
    breaking at least one logical segment comprising a plurality of characters into smaller logical segments in response to a user input to the multi-touch device, wherein the user input comprises maintained contact on the word on the multi-touch device for an amount of time that exceeds a predetermined time threshold.

15. A word correction system, comprising:
    a multi-touch device comprising a user interface, wherein the multi-touch device is configured to receive touch input from a user to interact with the user interface; and
    a word correction engine, configured to:
    detect a selection by the user of a word displayed in the user interface;
    break the word into logical segments, wherein at least one of the logical segments comprises a plurality of characters;
    present the logical segments in the user interface;
    detect a user-selected segment of one of the logical segments;
    display at least one alternative segment for the user-selected segment in the user interface; and
    alter the selected segment in response to receiving a user-selected replacement from the at least one alternative segment.

16. The system of claim 15, wherein the alternative segment comprises a common alternative usage of letters similar to the user-selected segment.

17. The system of claim 15, wherein the word correction engine is further configured to:
- determine a plurality of alternative segments for the user-selected segment, wherein each alternative segment comprises at least one letter difference than the user-selected segment; and
- display the plurality of alternative segments in the user interface.

18. The system of claim 15, wherein breaking the word into logical segments further comprises separating the word into syllables.

19. The system of claim 15, wherein breaking the word into logical segments further comprises separating the word into compound word segments.

20. The system of claim 15, wherein the word correction engine is further configured to:
- break at least one logical segment comprising a plurality of characters into smaller logical segments in response to a user input to the multi-touch device, wherein the user input comprises maintained contact on the word on the multi-touch device for an amount of time that exceeds a predetermined time threshold.

\* \* \* \* \*